United States Patent [19]
von Hippel et al.

[11] Patent Number: 6,056,932
[45] Date of Patent: May 2, 2000

[54] REACTOR FOR PERFORMING ENDOTHERMIC CATALYTIC REACTIONS

[75] Inventors: Lukas von Hippel, Alzenau, Germany; Dietrich Arntz, Moblie, Ala.; Bernd Kuttruf, Eschau; Brigitta Walter, Gelnhausen, both of Germany

[73] Assignee: Degussa-Huls Aktiengesellschaft, Frankfurt, Germany

[21] Appl. No.: 08/991,991

[22] Filed: Dec. 17, 1997

[30] Foreign Application Priority Data

Dec. 21, 1996 [DE] Germany .......................... 196 53 991

[51] Int. Cl.$^7$ ...................................... C01C 3/02
[52] U.S. Cl. ............................ 423/376; 423/659
[58] Field of Search ...................... 423/376, 659

[56] References Cited

U.S. PATENT DOCUMENTS

| | | | |
|---|---|---|---|
| 3,505,030 | 4/1970 | Sowards | 23/288 |
| 3,860,535 | 1/1975 | Johnson | 252/472 |
| 4,495,153 | 1/1985 | Midorikawa | 422/171 |
| 4,870,824 | 10/1989 | Young et al. | 431/328 |
| 5,112,578 | 5/1992 | Murayama et al. | 422/197 |
| 5,250,489 | 10/1993 | Dalla Betta et al. | 502/527 |
| 5,785,942 | 7/1998 | Hippel et al. | 423/376 |

FOREIGN PATENT DOCUMENTS

| | | |
|---|---|---|
| 0639548 A1 | 2/1995 | European Pat. Off. . |
| 0752390 A1 | 5/1996 | European Pat. Off. . |
| 3402713 A1 | 8/1985 | Germany . |
| 4214579 A1 | 11/1993 | Germany . |
| 9632188 | 10/1996 | WIPO . |

*Primary Examiner*—Wayne Langel
*Attorney, Agent, or Firm*—Smith, Gambrell & Russell, LLP; Beveridge, DeGrandi, Weilacher & Youn Intellectual Property Group

[57] ABSTRACT

A reactor for performing endothermic catalytic reactions is disclosed formed of a monolithic counterflow reactor with parallel heating and reaction channels. The internal walls of the reaction channels are coated with a catalyst for the catalytic reaction to be performed, while the internal walls of the heating channels have a catalyst for the catalytic combustion of a fuel gas/air mixture.

2 Claims, 5 Drawing Sheets

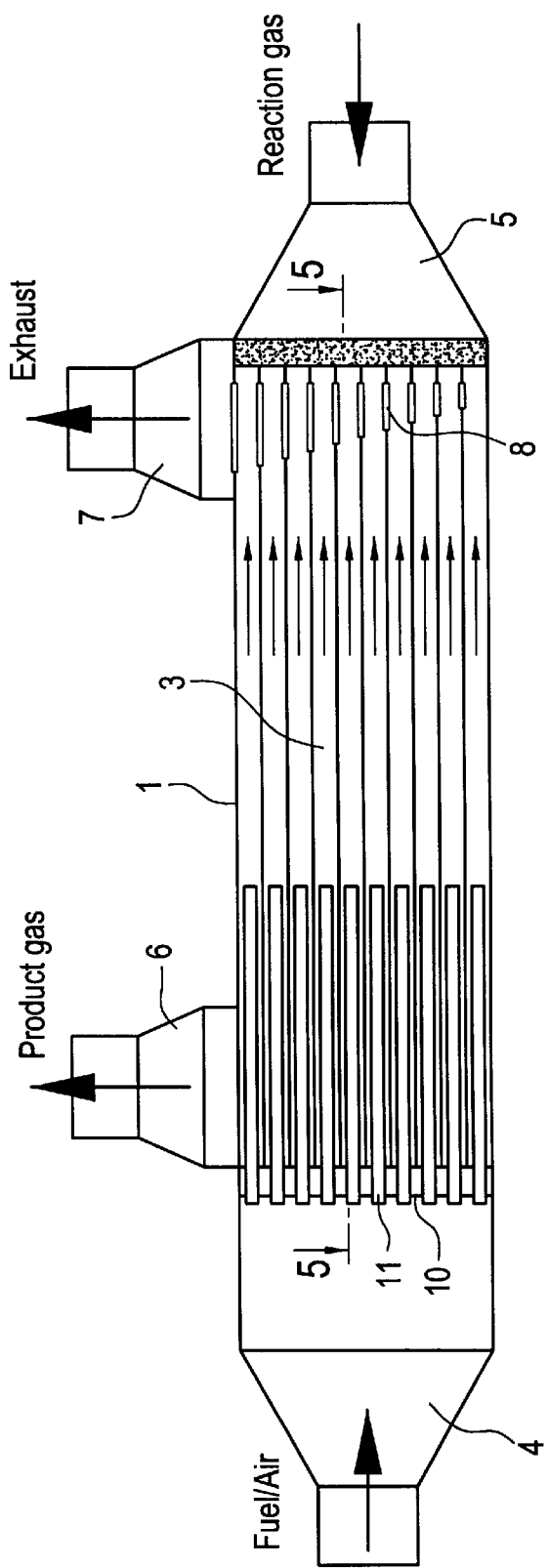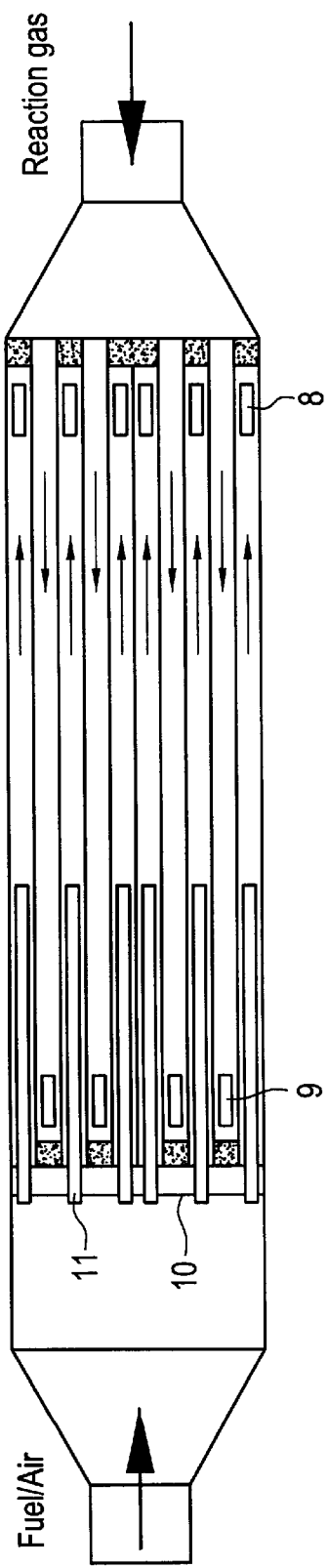

REACTOR FOR PERFORMING ENDOTHERMIC CATALYTIC REACTIONS

INTRODUCTION AND BACKGROUND

The present invention relates to a reactor for performing endothermic catalytic reactions. An endothermic catalytic reaction mentioned by way of example is the reaction of methane and ammonia to give hydrocyanic acid in the presence of a catalyst.

The catalytic reaction of methane and ammonia to give hydrocyanic acid is described in Ullmann's Encyclopedia of Industrial Chemistry, 5th ed. (1987), vol. A8, pages 162–163. Reaction takes place in the presence of an appropriate catalyst at temperatures of about 1000 to 1350° C. The reaction may be performed, for example, in tube bundle reactors. The reaction tubes essentially consist of aluminum oxide, and the internal surfaces are provided with a catalytically active coating which contains mostly platinum. The reaction tubes are suspended in the combustion chamber and are externally heated to the reaction temperature by combustion of a fuel gas, usually methane or natural gas, in an oxygen-containing gas which proceeds in a combustion chamber. The reaction tubes are typically about 2 m long and have an internal diameter of 16 to 18 mm.

The energy consumption required to produce one kilogram of desired product is critical to the economic viability of this type of process. In the case of the tube bundle reactor described above, about 40 MJ are required to produce one kilogram of hydrocyanic acid.

In European patent application EP 0752390A1, which is not a prior publication, a process for preparing hydrocyanic acid is described in which a monolithic arrangement of heating and reaction channels is used instead of the tube bundle reactor. The internal wall surfaces of the reaction channels are coated with a catalyst and the reactants flow through these reaction channels.

The reaction temperature required is produced, in this case, by combustion of a fuel gas in the heating channels. For this purpose, a mixture of fuel gas and combustion air is passed through the heating channels countercurrent to the flow of the reactants. On entering the heating channels, the gas mixture is ignited by electrical heating wires which are inserted into the heating channels.

The combination of heating and reaction channels in a monolithic arrangement can almost halve the energy demand required per kilogram of hydrocyanic acid produced as compared with a tube bundle reactor. In addition, the space-time yield can be greatly increased.

Despite these advantageous characteristics of the monolithic counterflow reactor, further improvements are required because combustion of the fuel gas/air mixture in the heating channels is not sufficiently stable.

In German patent application DE 34 02 713 A1 there is described a countercurrent reactor formed of a multiplicity of parallel plates for carrying out endothermic reactions with reaction temperatures up to 800° C. The endothermic reaction takes place in a first gaseous mixture, while the heat for reaction is supplied by way of an exothermic reaction in a second gaseous mixture. The first gaseous mixture and the second gaseous mixture are sent through the reactor in countercurrent direction with respect to each other whereby the first and second gaseous mixture stream through the space between the plates of the plate reactor in an alternating manner. The space between the plate is filled with particulate catalyst which catalyzes the particular endothermic or exothermic reaction.

German patent application 42 14 479 A1 discloses in FIG. 4, inter alia, a countercurrent reactor which can be used for strong exothermic or strong endothermic reactions. The reactor is made up of a plurality of mutually parallel arranged corrugated iron plates. The spaces between the plates form an alternating spatial arrangement for a throughput of a reaction gas mixture for an endothermic reaction and a heating gas. Instead of filling the spaces between the plates with a particulate catalyst, DE 42 14 579 A1 utilizes a catalyst for the endothermic reaction which is deposited as a layer on the surface of the plates which are in contact with the reactants. The surface of the corrugated iron plates which are in the path of the heating gas are not coated with a catalyst. The necessary energy for the endothermic reaction is conveyed to the reactor from outside through a hot heating gas.

A disadvantage of both of these prior reactors is the fact that they are suited for operation only at relatively low temperatures. At reaction temperatures over 800° C. and in particular at the reaction temperatures for the preparation of hydrocyanic acid from methane and ammonia according to the BMA process at 1000 to 1400° C. there is a tendency for these reactors to undergo an oxidation of the metallic plates from which they are constructed.

An object of the present invention is therefore to provide a monolithic reactor for performing endothermic catalytic reactions at temperatures above 800° C. which can withstand these elevated temperatures and which has improved and stable combustion in the heating channels.

SUMMARY OF THE INVENTION

The above and other objects of the invention are achieved by a reactor for performing endothermic catalytic reactions which contains an arrangement of a plurality of heating and reaction channels running parallel to each other, whose walls consist of a heat-resistant and gas-impermeable material, wherein the reaction channels contain a catalyst for the endothermic catalytic reaction, and the heating channels contain a catalyst for the catalytic combustion of a fuel gas/air mixture. The reaction channels and the heating channels have a length L.

The reactor is of a structure such that the reaction channels and the heating channels are arranged in a monolithic block, wherein the gas impervious material is a ceramic, and wherein the catalyst for the catalytic reaction and the catalyst for the catalytic combustion can be in the form of a layer or coating upon the wall surface of the reaction and heating channels.

In the reactor according to the present invention, heating and reaction channels are directly adjacent. In order to prevent passage of the gases through the walls of the reaction channels into the heating channels and vice versa, the reactor is constructed from a gas-tight ceramic which is also resistant to the high reaction temperatures required. This type of ceramic has a specific surface area which is only marginally greater than the geometric surface area of the reactor.

In contrast to the known monolithic reactor from EP 0752390A1, combustion in the heating channels of the reactor of the present invention is not initiated electrically, but instant catalytic combustion of the fuel gas/air mixture takes place. The reactor according to the invention therefore has two catalysts with different functions, a "reaction catalyst" deposited in the reaction channels for catalyzing the desired endothermic reaction, between the reactants and a "combustion catalyst" deposited on the walls of the heating channels for combustion of the fuel gas/air mixture.

BRIEF DESCRIPTION OF DRAWINGS

The present invention will be further understood with reference to the drawings, wherein:

FIG. 4 is a longitudinal sectional view of a reactor of the invention with flame injection pipes;

FIG. 5 is a sectional view along the plane AA in FIG. 4;

DETAILED DESCRIPTION OF INVENTION

Figure 1:
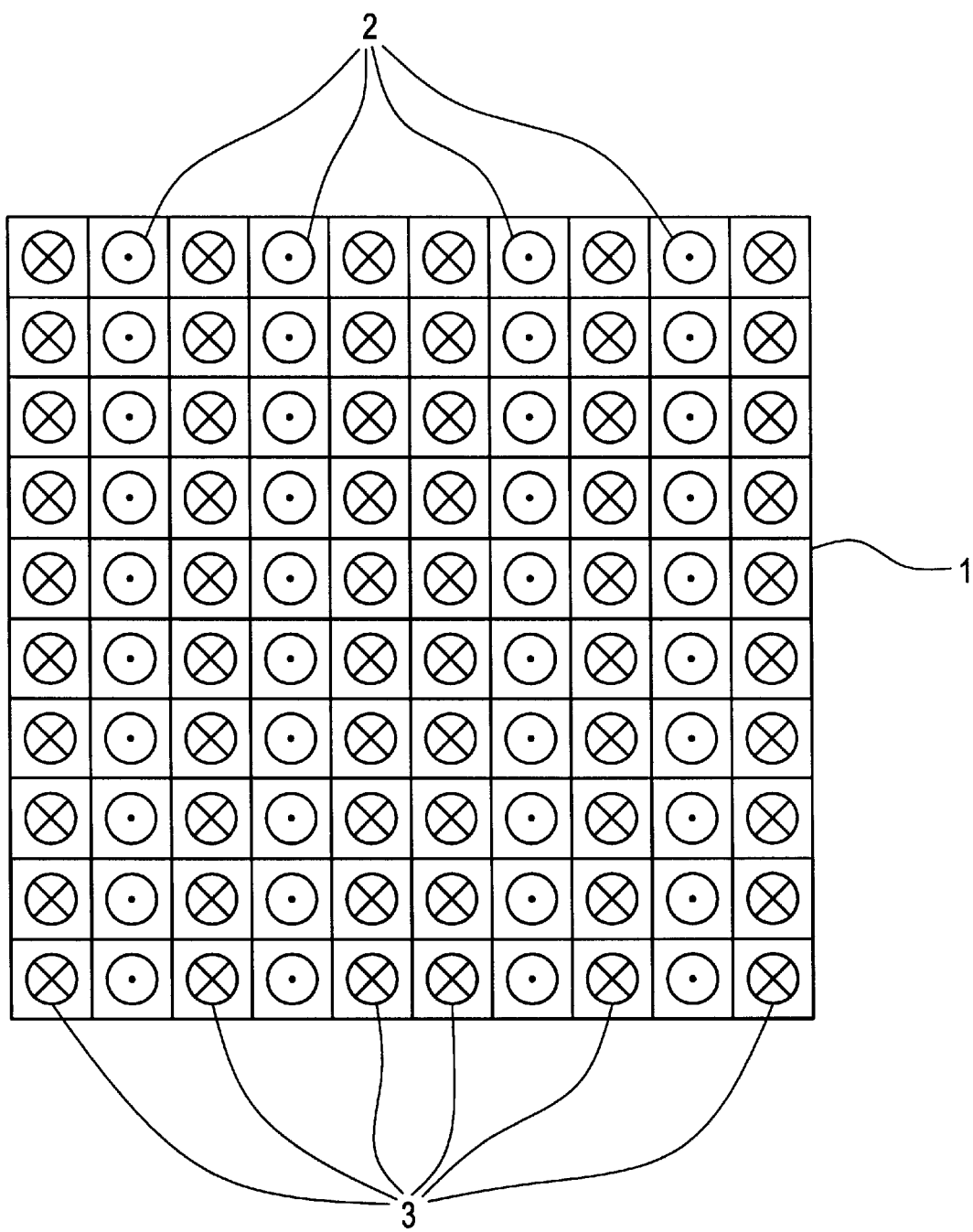
FIG. 1 is a schematic sectional view showing a preferred arrangement of heating and reaction channels over the cross-section of the reactor in the example.

Referring to the more detailed aspects of the reactor of the present invention, suitable combustion catalysts that can be used for purposes of this invention are basically any known catalysts for the catalytic combustion of a fuel gas/air mixture. A good review of possible catalyst materials is given in the article, "Catalytic Materials for High-Temperature Combustion" by Marcus F. M. Zwinkels et al. in Catal. Rev.-Sci. Eng., 35 (3), 319–358 (1993), which is relied on and incorporated herein by reference for the disclosure of combustion catalysts.

In individual cases, the combustion catalyst for catalytic combustion has to be selected based on the reaction being performed and the reaction temperature required. For reaction temperatures in the range 25 to 1200° C., any noble metal catalyst or noble metal oxide is suitable, such as for example palladium or platinum and combinations of the two metals. At high reaction temperatures at which palladium oxide is converted into palladium, combinations of palladium and platinum are particularly suitable because they are stable over a wider range of temperatures. The catalyst can be optimized for a specific temperature range by adjusting the palladium/platinum ratio.

To coat the heating channels with the catalytically active components of the combustion catalyst, the same techniques are used that are now widely used for the coating of monolithic honeycomb structures for car exhaust gas treatment. Due to the low specific surface area of the wall material in the reactor, finely divided oxidic materials with specific surface areas of more than 10 m$^2$/g (measured by using nitrogen adsorption isotherms in accordance with the German Industrial standard DIN 66 132 which is incorporated herein by reference) are generally used as supports for the catalytically active components. Suitable support materials are, for example, active aluminum oxides (also called transition aluminum oxides; see Ullmann's Encyclopedia of Industrial Chemistry, fifth edition, vol. A1, 561–562 (1985)) and transition metal oxides (iron oxide, manganese oxide, titanium oxide, zirconium oxide). To increase the heat-resistance, these support materials may be doped with suitable stabilizers such as, for example, rare earth metals, alkaline earth metals and silicon. These are matters known in the art.

The finely divided support materials are processed to provide a coating dispersion which is typically an aqueous dispersion. The heating channels are coated with the support materials by immersing the monolithic reactor in this coating dispersion, removing excess dispersion and calcining. In order to avoid coating the reaction channels with the combustion catalyst, the reaction channels must first be sealed with, for example, wax or adhesive tape. The catalytically active components may be applied to the support material before or after coating the heating channels, by impregnating with soluble precursors of the catalytic components.

The formulation for the reaction catalyst, naturally, depends directly on the chemical reaction to be performed. In the case of preparing hydrocyanic acid from methane and ammonia, a reaction catalyst which contains platinum and aluminum nitride is preferably used. EP 0 407 809 B1 and DE 196 17 040, the latter of which is not a prior publication, describe processes for preparing this type of catalyst.

Suitable materials for the reactor structure are ceramics made from oxides, carbides and nitrides, and mixtures thereof. If the ceramics used are porous materials, the walls of the reactor must be coated to make them gas-tight. The reactor is preferably made of alpha or gamma-aluminum oxide. Depending on the method of production, this material may also contain small amounts of other oxides. Ceramic materials are used for construction of the reactor of this invention because of their outstanding thermal properties and their higher corrosion resistance in comparison to steel.

The reactor in monolithic form to be used in accordance with the present invention may be produced from ceramic materials using known extrusion techniques.

Heating and reaction channels may be distributed over the cross-section of the monolith in any pattern at all. FIG. 1 shows one suitable array where parallel alternating rows of channels are used. To optimize heat transfer between heating and reaction channels, and to facilitate supplying the fuel gas/air mixture and reaction gas mixture to the allocated channels, it is expedient to arrange the heating and reaction channels respectively in parallel strata which consist of one or more layers of heating or reaction channels respectively. An expedient channel density over the cross-section of the reactor is 0.1 to 100 cm$^{-2}$. If the channel density is less than 0.1 cm$^{-2}$, heat exchange between the heating and reaction gases is no longer sufficiently reliable, due to the large cross-sectional size of the channels. With increasing channel density, the separate supply and discharge of heating and reaction gases to and from the allocated channels becomes increasingly difficult. It is not sensible to use channel densities greater than 100 cm$^{-2}$ for the reactor design described here.

Direct coupling of the exothermic combustion of the fuel gas/air mixture to the endothermic chemical reaction in a monolithic counterflow reactor offers a variety of different advantages. In the case of endothermic reactions, the gas streams at the reactor discharge must be rapidly cooled to a low temperature in order to avoid back reactions. In the case of the preparation of hydrocyanic acid, the product gases, for example should be cooled as quickly as possible below temperatures of 800° C. In addition, the heat content of the emerging gas streams should be recovered for reasons of efficiency. The reactor according to the invention combines these functions such as heating the reaction gases, chemical reaction, quenching and heat recovery in one piece of equipment.

The fuel gas/air mixture and the reaction gas mixture are fed in the cold state from opposite directions into the respectively allocated heating and reaction channels. Catalytic combustion of the fuel gas/air mixture being initiated in the heating channels is complete after a certain distance. The heat energy being released by this exothermic reaction is transferred from the hot exhaust gas to the cold reaction mixture by indirect heat exchange. The product gas mixture, which is still hot following reaction, in turn transfers its residual heat to the incoming cold fuel gas/air mixture. By means of appropriate adjustment of the volume flows of the fuel gas/air mixture and the reaction mixture with respect to each other, the reactor can be operated in such a manner that both the exhaust gas from combustion and the product gas mixture leave the reactor almost cold again. Therefore, there are high temperature gradients along the length of the reactor. In the examples, maximum temperature gradients of more than 250° C./cm were experienced.

The novel operating procedure of a countercurrent reactor is made possible by the arrangement of reaction channels and heating channels in a monolithic block of ceramic material. The ceramic material exhibits only a low thermal expansion. The reactor is therefore not deformed or ruined because of the high temperature gradients that arise along the length of the current flow passages.

It follows as a result of the monolithic construction that the reactor of the invention also exhibits a good mechanical stability even when the wall thickness of the channels are minimized in order to optimize the heat exchange between the heating and reaction channels. The tight contact between the heating and reaction channels guarantees, in spite of the low heat conductivity of the reactor material, still an outstandingly high heat transmission from the flow of combustion gases in the heating channels to the reaction gas in the reaction channels.

The low heat conductivity of the ceramic material in combination with the low wall thickness of the flow channels hinders a temperature equilibrium along the current flow channels through heat conduction in the reactor material.

In operation of the inventive countercurrent flow reactors, therefore, a definite temperature profile is produced along the reactor. In the case of synthesizing hydrocyanic acid, the reactor may be operated in such a way that the two end faces are at a temperature below 200° C., whereas the reaction temperatures of 1000 to 1350° C. required can be maintained in the middle section of the reactor. To optimize the temperature profile, catalytic combustion can be shifted towards the interior of the reactor by leaving a catalytically uncoated region at the fuel gas inlet end.

This uncoated region can extend from the inlet of the fuel gas/air mixture into the depth of the channels for a maximum of 50 to 98% of the total length L of the reactor. Preferably, however, the heating channels are coated over their entire length with the combustion catalyst. Optimization of the temperature profile can then be very simply attained by introducing the fuel gas/air mixture into the heating channels by flame injection pipes. For the purposes of temperature profile optimization the immersion depth of the flame injection pipes in the heating channels may be varied. The maximum immersion depth of the flame pipes in the heating channels can range from 50 to 90% of the total length L of the reactor.

To start catalytic combustion, a mixture of hydrogen and air as fuel gas/air mixture must be introduced into the heating channels initially. This mixture can be ignited by a combustion catalyst at room temperature. After reaching a temperature of about 500° C. in the middle section of the reactor, a switch may be made to the actual fuel gas. A mixture of methane and propene is preferably used as fuel gas for steady-state operation of the reactor. With increasing temperature in the reactor, homogeneous combustion occurs in competition with catalytic combustion. At temperatures above 1000° C., the homogeneous combustion reaction is dominant.

The fuel gas/air mixture and the reaction gas mixture have to be fed to the allocated channels in the reactor in the simplest possible way. A good solution to this problem is the indirect heat exchanger in the form of a monolithic honeycomb structure described in U.S. Pat. No. 4,271,110. In analogy to the disclosure in U.S. Pat. No. 4,271,110, supply and removal of the gas streams may take place as follows, when the heating and reaction channels are arranged in alternate layers or rows. The fuel gas/air mixture is fed to the first end face using a conical pipe-connector mounted on the end face. The reaction gas mixture is fed to the second end face in a corresponding manner. The flow channels are sealed in the axial direction on the end face at the other end from the particular feeding end face, in order to prevent mixing of the two gas streams. Removal of the gas streams is performed via the side faces of the reactor. For this purpose, openings are incorporated in the reactor, starting from one side face, which connect all the channels in one layer. By mounting a gas pipe-connector on the side face of the reactor, the gas streams emerging from the individual layers can be combined.

The following example is intended to explain the invention in more detail.

EXAMPLE 1

A gas-tight monolith with 15.5 cells per square centimeter made of α-aluminum oxide was used as a reactor for synthesizing hydrocyanic acid. The reactor had a length of 50 cm and a cross section of 2.6×2.6 cm with a total of 100 channels (10×10 matrix). The accessible orifice in the flow channels had dimensions of about 2×2 mm². The thickness of the channel wall is about 0.55 mm. This monolith was subdivided into 60 heating and 40 reaction channels, for reasons of symmetry, as shown in FIG. 1. The volume of heating channels and reaction channels was together 0.2 l, of which 0.08 l represented the reaction channels. Heating and reaction channels were grouped together in rows. As shown in FIG. 1, the monolith 1 is made up of a plurality of layers of reaction channels 2, and a plurality of layers of heating channels 3. The symbol ⊗ represents fuel gas/air mixture flowing into the plane of the drawing and the symbol ⊙ represents reaction gas mixture flowing out of the plane of the drawing.

Figure 2:
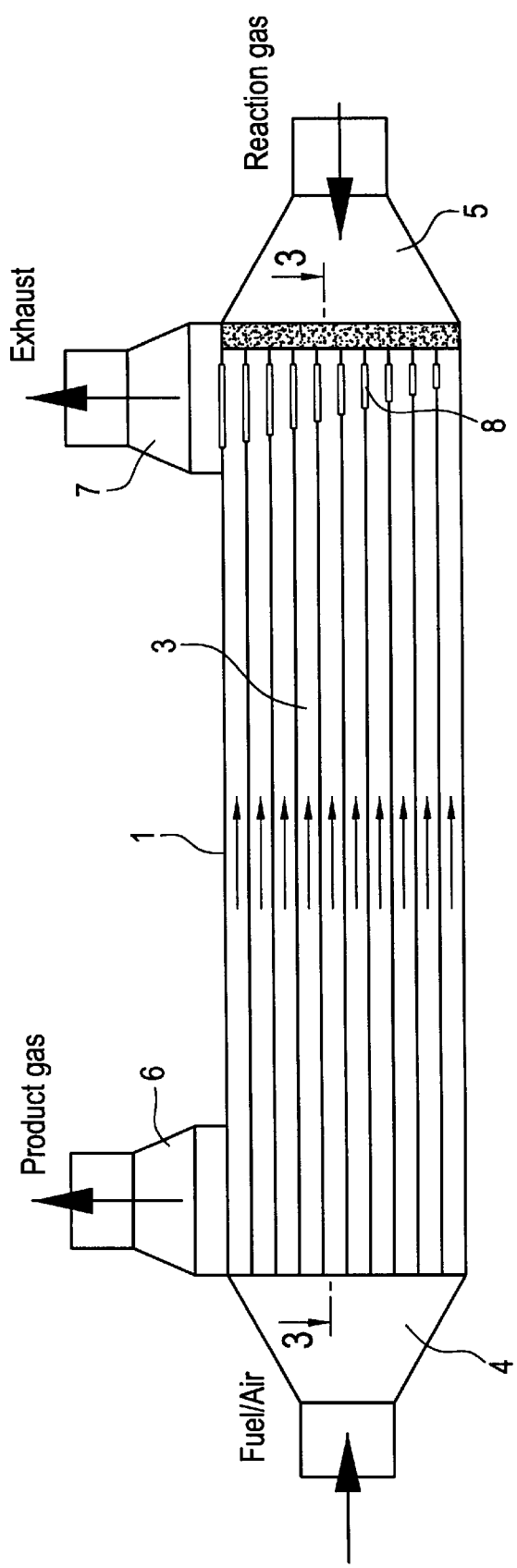
FIG. 2 is a schematic longitudinal sectional view of the reactor of the invention.

FIG. 2 shows a longitudinal section through the reactor 1 with fuel gas/air mixture supply pipe 4 mounted on the end face 10 and with reaction gas mixture supply pipe 5 mounted on the other end face 11 of the monolith 1. Gas removal pipes 6, 7 are located on the side wall of the reactor.

The longitudinal sectional view through the reactor shown in FIG. 2 is taken parallel to one layer of heating channels. The fuel gas/air mixture is supplied to heating channels 3 via supply pipe 4 and flows towards the second end face 11. At this second end face, the heating channels are axially sealed. Removal of the exhaust gas after combustion has taken place is performed via openings 8 which are incorporated in the separating walls of the heating channels from one side wall of the reactor 1 parallel to the heating channels and all the heating channels are connected to exhaust gas pipe 7. In the same way, the reaction gas mixture is supplied via the supply pipe 5 and is passed through the reactor 1 in counterflow to the fuel gas/air mixture and removed as product gas mixture via gas pipe 6.

Figure 3:
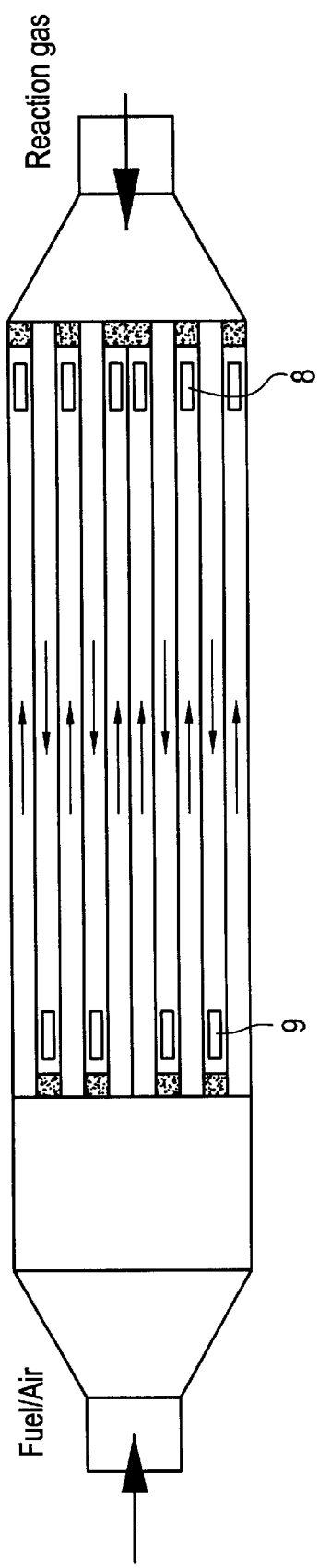
FIG. 3 is a schematic sectional view along plane AA in FIG. 2.

FIG. 3 shows a sectional view through the reactor 1 parallel to plane AA in FIG. 2. It shows the alternately sealed heating channels 3 and reaction channels 2 as well as openings 8 and 9, incorporated in the separating walls of the channels, for removing the respective gas streams.

The reaction channels 2 in the reactor 1 were coated with 2.77 g of reaction catalyst in accordance with example 2 in EP 0 407 809 B1 which is incorporated herein by reference.

To prepare the combustion catalyst, 500 g of zirconium oxide powder (specific surface area 100 $m^2/g$) were impregnated with a noble metal solution containing 48.9 g of platinum nitrate (30.7 wt. % of platinum) and 542.2 g of palladium nitrate (8.3 wt. % of palladium). The impregnated powder was dried at 150° C. and then calcined at 600° C. for 4 hours (rate of heating 200° C./h). Then the powder was reduced in a gas mixture of 5 vol-% of hydrogen in nitrogen (forming gas) at 500° C. for a period of 3 hours. After cooling, the powder was dispersed in water and the internal walls of the heating channels were coated with the dispersion. The final reactor contained 2.31 g of combustion catalyst.

To form the reaction catalyst, combustion was first of all started in the heating channels. For this, a mixture of hydrogen and air was passed through the heating channels and, in counterflow to that, ammonia was passed through the reaction channels. When the temperature had risen to above 500° C., due to the combustion of hydrogen, the hydrogen was replaced by methane and propene. The volume flows of the individual gases were 411 l/h of air, 32 l/h of methane and 0.5 l/h of propene in the heating channels and 251 l/h of ammonia in the reaction channels. After reaching a temperature of 1000° C., supply of the gases was continued for a further 12 hours. Then methane was slowly added to the ammonia in the reaction channels until the ratio of ammonia to methane was 1.12 so that during the synthesis of hydrocyanic acid about 530 l of the ammonia/methane gas mixture per hour was introduced into the reaction channel, corresponding to a space velocity of 6625 $hr^{-1}$. The current velocity of the reaction gas mixture in the reaction channel was about 0.27 m/s The reactor produced 78% of hydrocyanic acid, with reference to the methane used, under steady-state operation. The temperature of the reactor at the inlet for the fuel gas/air mixture was 112° C. and at the inlet for the reaction gas mixture was 157° C.

Figure 6:
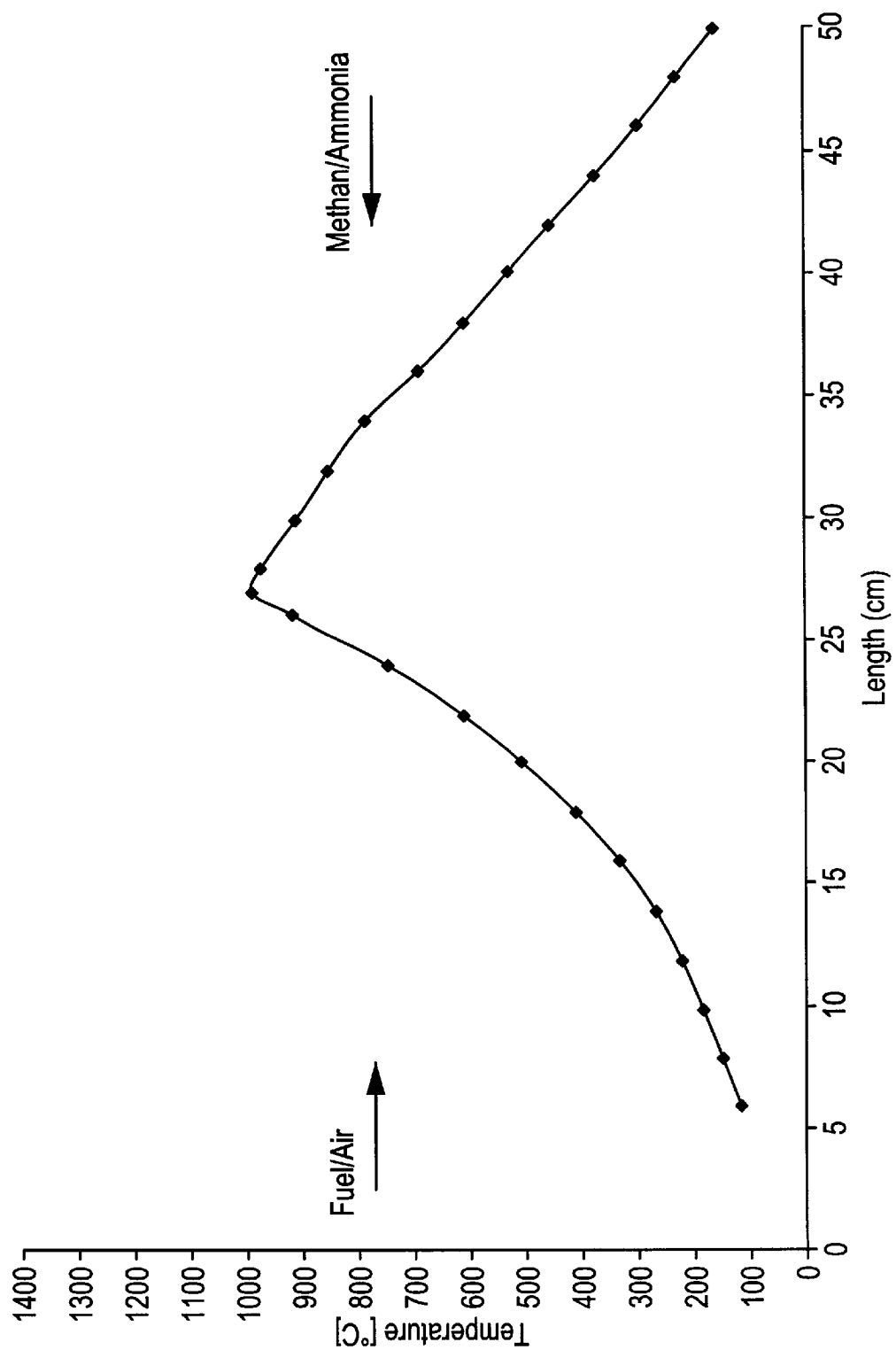
FIG. 6 is a graph of a temperature profile along the reactor of FIG. 2 when synthesizing hydrocyanic acid.

FIG. 6 shows the temperature profile along the reactor, measured with a thermocouple, during the synthesis of hydrocyanic acid.

EXAMPLE 2

The reactor of Example 1 was modified according to the schematic representation in FIG. 4 with flame injector pipes. The latter were secured to an intermediate panel 10 in the gas injection stage 4 and extended into the heating channels to a depth of 20 cm. In this way, the combustion began first at the exit of the flame injection pipes at a depth of 20 cm in the interior reactor. FIG. 5 shows a sectional view through the reactor parallel to the plane AA of FIG. 4.

Figure 7:
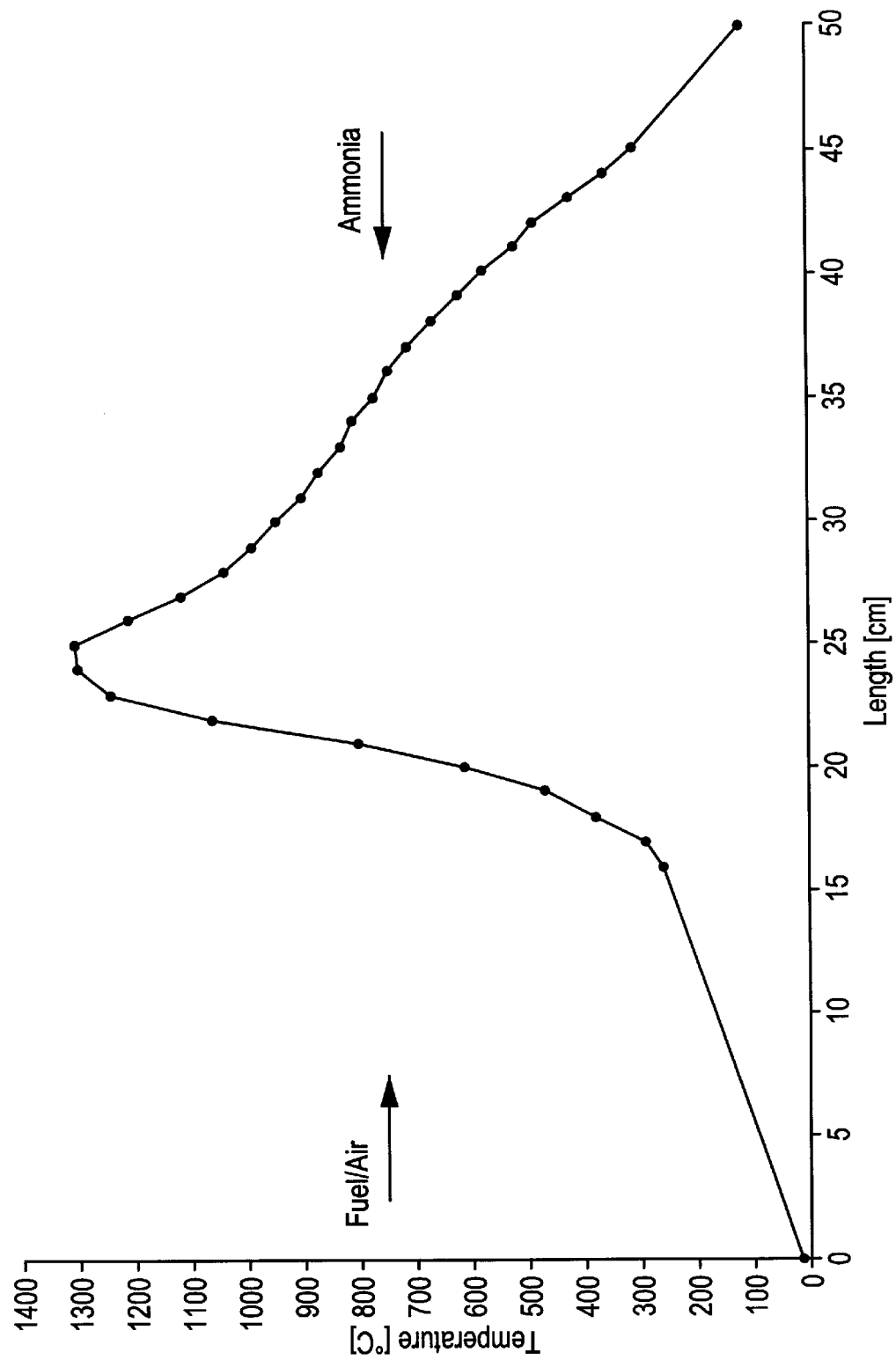
FIG. 7 is a graph of a temperature profile along the reactor of FIG. 4 when synthesizing hydrocyanic acid.

The purpose of this modification was to develop an even more steep temperature profile than in the previous example. In the heating channels, the same fuel gas/air mixture was burned as in example 1. For simplification of the measurement, the synthesis of the hydrocyanic acid was omitted. Therefore, only 110 l ammonia per hour were charged through the reaction channels. The measured temperature profile is shown in FIG. 7.

At the introduction point of the fuel gas/air mixture into the reactor, the temperature of 22° C. was measured. The combustion itself commenced at the exiting point of the flame injector pipe at a depth of 20 cm in the channel.

The temperature in the reactor reached 1300° C. at the middle of the reactor. The maximum temperature gradient along the reactor was 260° C. per cm. In the case of preparation of hydrocyanic acid this means that the hydrocyanic acid produced in the reaction is cooled down from 1300° C. to 800° C. in a length of only 4 cm.

It is noteworthy that with this arrangement, the reactor at the point of entry of the fuel gas/air mixture is at room temperature and at the exiting point is also at a very low temperature of somewhat more than 100° C. This signifies a very high heat exchange and energy utilization in this reactor. In addition, this design, having a low temperature at the fuel gas entry point, enables the construction of a simple arrangement for adjusting the immersion depth of the flame injection pipes into the reactor, and thereby determining the onset of combustion within the reactor.

The reactor of this invention therefore enables an endothermic reaction to take place with an until now unattainable energy efficiency, and permits an easy match up of the temperature profile along the rector according to the requirements of the endothermic reaction. The catalytic combustion in the heating channels runs in a stable manner.

Further variations and modifications of the foregoing will be apparent to those skilled in the art and are intended to be encompassed by the claims appended hereto.

German priority application 196 53 991.9 is relied on and incorporated herein by reference.

We claim:

1. A method for performing an endothermic catalytic reaction, comprising:
   conveying reactants for the endothermic catalytic reaction into the reaction channels of a reactor which comprises an arrangement of a plurality of heating channels and a plurality of reaction channels running parallel to each other in a monolithic block, the heating channels and the reaction channels having walls consisting of a heat-resistant and gas-impermeable ceramic material, wherein
   the reaction channels have internal walls coated with a catalyst for an endothermic catalytic reaction, and wherein
   the heating channels have internal walls coated with a catalyst for catalytic combustion; and
   conveying a fuel gas/air mixture into the heating channels in a direction opposite to a direction of conveying the reactants, so as to reach a temperature of reaction for the catalytic reaction in the reactor and thereby perform the endothermic catalytic reaction.

2. The method according to claim 1, wherein hydrocyanic acid is a product of the reaction, and ammonia and methane are the reactants which are reacted within the reaction channels of the reactor.

* * * * *